United States Patent
Vaughn et al.

[11] Patent Number: 5,944,489
[45] Date of Patent: Aug. 31, 1999

[54] ROTARY FLUID PUMP

[75] Inventors: Paul E. Vaughn, Lumberville; James Lobach, Downingtown; Edward W. Mattes, Warrington, all of Pa.

[73] Assignee: Crane Co., Warrington, Pa.

[21] Appl. No.: 08/872,751

[22] Filed: Jun. 11, 1997

Related U.S. Application Data

[60] Provisional application No. 60/032,811, Dec. 11, 1996.

[51] Int. Cl.⁶ .............................. F04B 49/06; F04B 17/00
[52] U.S. Cl. .................................... 417/44.1; 417/423.12; 417/423.13
[58] Field of Search .............................. 417/44.1, 423.12, 417/423.13

[56] References Cited

U.S. PATENT DOCUMENTS

| | | | |
|---|---|---|---|
| 3,508,241 | 4/1970 | Potter | 340/269 |
| 3,897,116 | 7/1975 | Carpenter | 308/1 |
| 3,963,283 | 6/1976 | De Feo et al. | 308/78 |
| 4,063,786 | 12/1977 | Rall . | |
| 4,320,431 | 3/1982 | Bell . | |
| 4,584,865 | 4/1986 | Hutchins . | |
| 4,732,491 | 3/1988 | Geczy | 384/95 |
| 5,059,092 | 10/1991 | Kabelitz et al. | 415/90 |
| 5,140,311 | 8/1992 | Cook . | |
| 5,163,812 | 11/1992 | Klaus | 415/171.1 |
| 5,224,835 | 7/1993 | Oltman | 417/12 |
| 5,297,927 | 3/1994 | Aizawa et al. | 415/110 |
| 5,308,169 | 5/1994 | Baker et al. | 384/99 |
| 5,346,316 | 9/1994 | Okada et al. | 384/297 |
| 5,380,112 | 1/1995 | Schicktanz et al. | 403/28 |
| 5,679,992 | 10/1997 | Miyamoto et al. | 310/90.5 |
| 5,696,444 | 12/1997 | Kipp et al. | 324/207.32 |
| 5,796,349 | 8/1998 | Klein | 340/682 |

FOREIGN PATENT DOCUMENTS

| | | |
|---|---|---|
| 2476772 | 8/1981 | France . |
| 3416343 | 11/1985 | Germany ........................ 417/423.12 |

*Primary Examiner*—Charles G. Freay
*Assistant Examiner*—Paul Ratcliffe
*Attorney, Agent, or Firm*—Renner, Otto, Boisselle & Sklar, P.L.L.

[57] ABSTRACT

A fluid pump includes main support bearings for supporting the impeller shaft and back-up bearings for supporting the shaft upon failure of the main support bearings. The back-up bearings are positioned between the main support bearings and shaft driver/motor, and have a radial clearance with the shaft which is greater than the radial clearance between the main support bearings and shaft and yet is small enough to prevent any shards that may result from failure of the main support bearings from passing through the radial clearance space between the back-up bearings and shaft and damaging other rotating parts of the pump. A diagnostic monitor detects wear or failure of the main support bearings by sensing relative shaft displacement. Also, a controller causes the driver to shut down when a predetermined amount of allowable wear of the main support bearings is reached.

26 Claims, 3 Drawing Sheets

ROTARY FLUID PUMP

CROSS-REFERENCE TO RELATED APPLICATIONS

This application claims the benefit of U.S. Provisional Application No. 60/032,811, filed Dec. 11, 1996.

FIELD OF THE INVENTION

This invention relates generally, as indicated, to a rotary fluid pump, and more particularly to a bearing system for a sealless pump.

BACKGROUND OF THE INVENTION

Bearing systems for sealless pumps are used to radially support the rotor assembly used to drive the pump. Axial loads occurring during start-up, operation, or upset conditions are also carried by the bearing system. Under normal conditions, the rotor assembly is submerged in the fluid being pumped, and by design, such fluid is circulated around the rotor assembly and bearings to cool the motor or driver and lubricate the bearing system.

Fluids that are pumped by sealless pumps are generally corrosive, highly volatile, low viscosity, having very high or low temperature (ranging for example from cryogenic to 1,000° F.), and oftentimes contain hard erosive contaminants. These conditions must be mitigated by pump design, or handled by the bearing system.

Generally speaking, special grades of carbon-graphite bushings or bearings operating against stainless steel provide the best performance over the widest range of conditions. However, for difficult applications or application with compatibility issues, special bearing materials may be necessary. For example, fluid compatibility may dictate the use of bearings made of Teflon or Rulon materials, while high temperature and particulate contamination may require the use of bearings made of hard bearing materials such as aluminum oxide (ALOX), tungsten carbide, or silicon carbide (SiC). These materials are characterized by high values of hardness (Vickers - 2000+), and in the case of ALOX and SiC, are extremely brittle and easy to fracture due to rough handling or vibration. Also, because hard bearings typically have relatively low thermal conductivity, they are very susceptible to heat build-up due to dry running or cavitation. These conditions, which can be common occurrences with sealless pumps, can result in bearing failures.

Failure modes of hard bearings in sealless pumps can be particularly catastrophic, since when hard bearings fail, they usually shatter like glass, making hundreds of razor sharp shards which can pierce stainless steel liners or shrouds exposing motor windings or external magnets to the pumping fluid. Besides requiring very expensive repairs, the resulting leakage of volatile or corrosive pumping fluids (chemicals) can be extremely hazardous.

There is thus a need for a bearing system for rotary fluid pumps including particularly sealless pumps which can advantageously use hard bearings while minimizing the dangers of bearing failure associated with their use.

SUMMARY OF THE INVENTION

The present invention relates to a bearing system for a rotary fluid pump which includes a back-up bushing or bearing for supporting the rotor shaft in the event of a failure of the main support bearing.

In accordance with one aspect of the invention, the back-up bushing provides support for the rotor shaft through a journal surface fixed to the shaft upon failure of any of the main support bearing components.

In accordance with another aspect of the invention, the back-up bearing is strategically located to prevent any shards that may result from failure of any of the main support bearing components from damaging other rotating parts of the pump.

In accordance with another aspect of the invention, a bearing wear detector may be provided in combination with the back-up bearing to detect a failure of any of the main support bearing components and permit the pump to be safely shut down before any other damage can occur to the pump.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE PREFERRED EMBODIMENT

Figure 1:
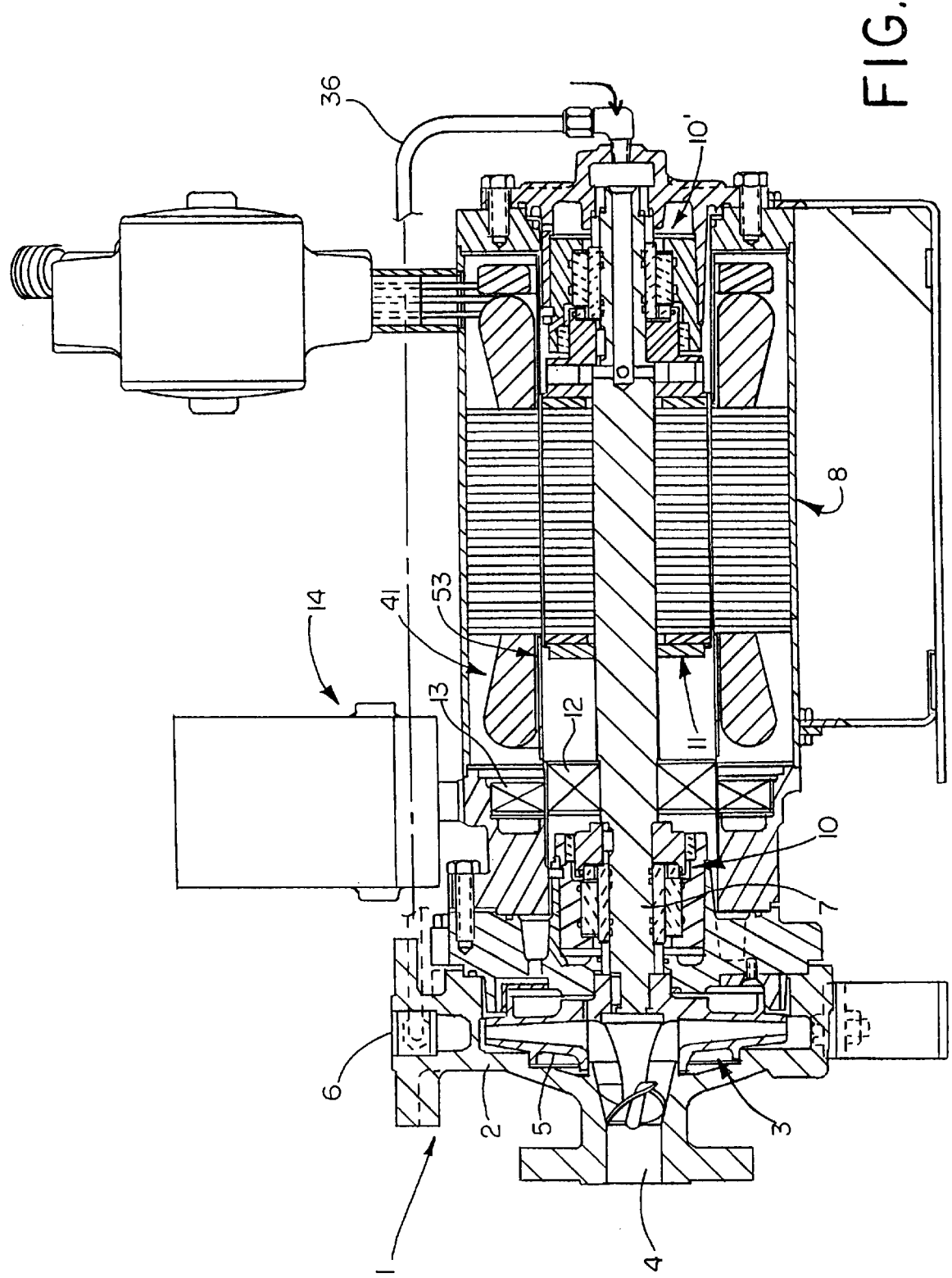
FIG. 1 is a fragmentary longitudinal section through one form of pump in accordance with the invention.

FIG. 1 shows one form of rotary fluid pump 1 in accordance with this invention including a pump housing 2 containing a pump chamber 3 having a central fluid inlet 4 into which the fluid to be pumped is drawn during rotation of an impeller 5 within the pump chamber for pressurizing the fluid prior to being discharged through the main pump outlet 6.

Pump impeller 5 is suitably mounted on the output shaft 7 of a drive motor 8. At opposite ends of the motor shaft 7 are bearing systems 10, 10' for supporting the rotor assembly 11 of the motor as described hereafter.

Figure 2:
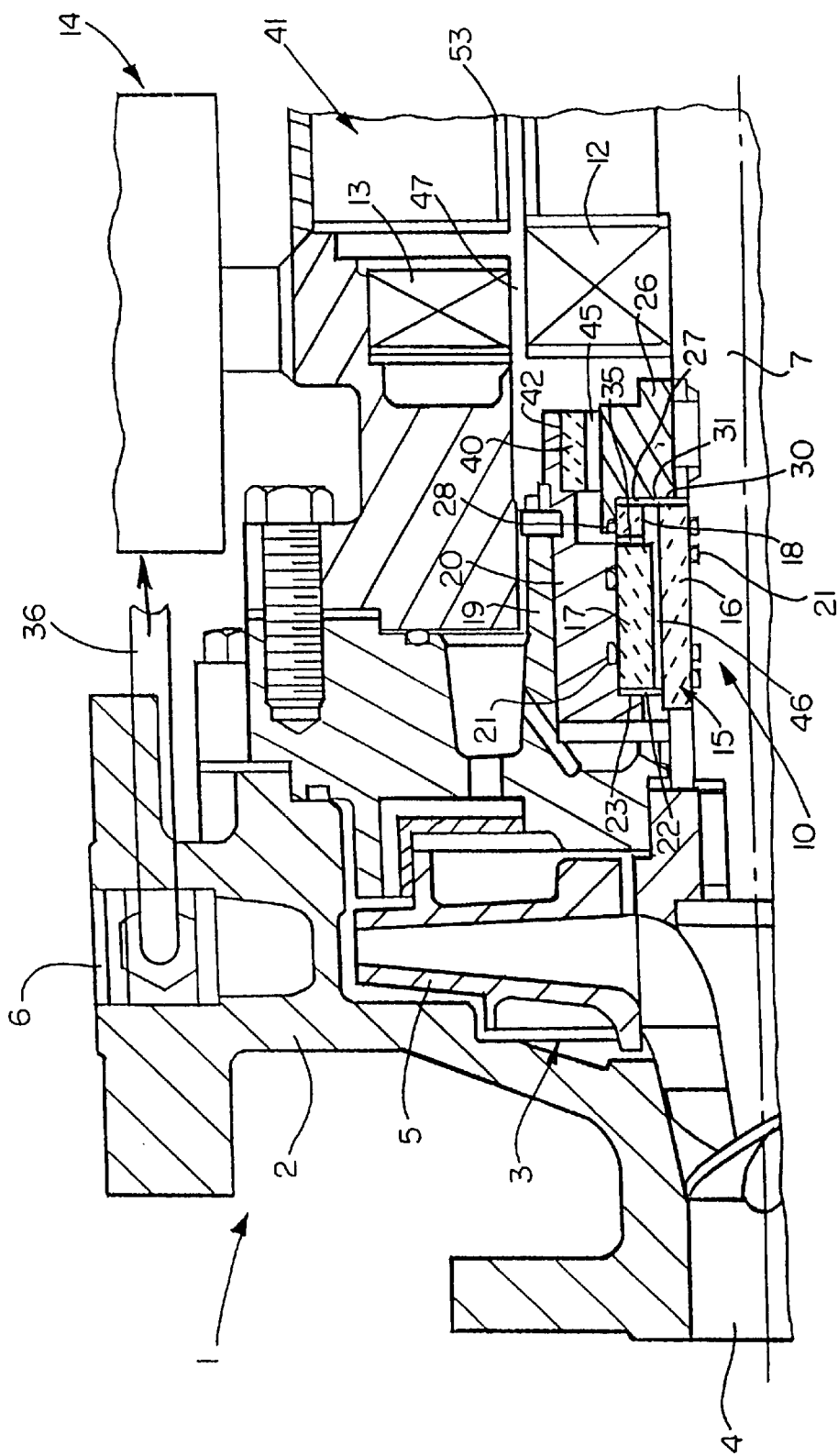
FIG. 2 is an enlarged fragmentary longitudinal section through the pump of FIG. 1 in which the clearances between the various moving parts of the pump, including particularly the bearing and rotor-stator clearances are exaggerated for illustrative purposes.

Only one such bearing system will be described in detail (the bearing system 10 that supports the end of the shaft 7 on which the pump impeller 5 is mounted), it being understood that the other bearing system 10' may be substantially identical. Also, for purposes of clarity, the clearances between the various components of the bearing system 10 and rotor and stator portions 12, 13 of a bearing wear detector 14 shown in FIG. 2 are exaggerated.

The bearing system 10 includes a main support bearing 15 for the motor shaft 7 comprising a shaft sleeve 16 and surrounding bushing 17 and thrust ring 18. The bushing 17 is coaxially supported within a counterbore 19 in the pump housing 2 by means of a bushing retainer 20 pinned or otherwise secured to the pump housing. Suitable seals 21 may be provided between the motor shaft 7 and shaft sleeve 16 as well as between the bushing 17 and bushing retainer 20. Also, a washer 22 is disposed between a shoulder 23 of the bushing retainer 20 and one end of the bushing 17.

Thrust ring 18 is supported adjacent the other end of the bushing 17 by a thrust ring retainer 26 keyed or otherwise affixed to the motor shaft 7 for rotation therewith. The thrust ring retainer 26 includes a recess 27 in which the thrust ring 18 is received, with a suitable seal 28 interposed between the outer diameter of the thrust ring and inner wall of the recess. Also, a washer 30 is disposed between shoulder 31 of thrust ring retainer 26 and adjacent ends of the shaft sleeve 16 and thrust ring 18. During normal operation, the bushing 17 and shaft sleeve 16 carry the radial load, and the bushing 17 and thrust ring 18 carry axial loads during start-up, operation or upset conditions. The bushing and thrust ring retainers 20 and 26 are designed to support and align the main support bearing components and fix them from rotation relative to their respective retainers.

A plurality of radial grooves 35 in the rotating thrust ring 18 provide a pumping action to promote fluid flow through the bearing system 10 for cooling and lubrication. Also using retainers 20 and 26 for the bushing 17 and thrust ring 18 permits the bushing and thrust ring to be made with relatively thin cross sections to permit better heat removal from the main support bearing 15.

Under normal conditions, the bearing system 10 is submerged in the same fluid as the pump 1, and by design, a portion of the fluid being pumped is directed through a fluid line 36 extending from the pump outlet 6 to the bearing system 10' that supports the other end of the motor shaft 7 for circulation around the rotor assembly 11 and both bearing systems to cool the motor or driver 8 and lubricate the bearing systems.

Fluids that are pumped by sealless pumps are generally corrosive, highly volatile, low viscosity, and have very high or low temperature, ranging for example from cryogenic to 1,000° F. Also, such fluids often contain hard erosive contaminants. For difficult applications or applications with compatibility issues, special bearing materials may be necessary. For example, fluid compatibility may dictate the use of Teflon or Rulon materials for the main support bearing components, while high temperatures and particulate contamination may require the use of hard bearing materials such as aluminum oxide (ALOX), tungsten carbide, or silicon carbide (SiC). Also, the shaft sleeve 16 may be omitted, and stellite or tungsten carbide or other suitable material may be flame sprayed or welded directly to the rotor shaft 7 to provide a hard mating surface for the bushing 17.

Because bearings made of such hard materials typically have low thermal conductivity, they are very susceptible to heat build-up due to dry running or cavitation. Also, bearings made of ALOX and SiC are extremely brittle and easy to fracture due to rough handling or vibration. These conditions can be common occurrences with sealless pumps, and can result in bearing failures which can be particularly disastrous, since hard bearings usually shatter like glass, making razor sharp shards which can pierce stainless steel liners or shrouds exposing motor windings or external magnets to the fluid being pumped. Also, the resulting leakage of volatile or corrosive fluids can be extremely hazardous.

In the event of a failure of one or both of the radial main support bearing components of the present invention (e.g., the bushing 17 and/or shaft sleeve 16), a back-up bushing or bearing 40 is provided for supporting the rotor shaft 7 through a journal surface fixed to the shaft. In the embodiment shown, the journal surface is the thrust ring retainer 26. Also, the back-up bearing 40 is located between the main support bearing 15 and motor or drive cavity 41 in a counterbore 42 in the bushing retainer 20 surrounding the thrust ring retainer 26. The back-up bearing 40 may be made of the same materials as the main support bearing components and is limited only by temperature and fluid compatibility issues.

Preferably, the clearance 45 between the thrust ring retainer 26 and surrounding back-up bearing 40 is small enough to prevent any of the bearing shards that may result upon failure of any of the main support bearing components 16, 17 and 18 from entering the motor cavity 41 and damaging other rotating parts. However, since long term running on the back-up bearing is not recommended, such clearance 45 is desirably set large enough so that the bearing wear detector 14, schematically shown in FIGS. 1 and 2, may be used to sense excessive bearing wear and permit safe shut-down of the pump 1 before any other damage can occur.

The bearing wear detector 14 may, for example, be of the type disclosed in U.S. patent application No. 08/206,461, filed Mar. 4, 1994, now U.S. Pat. No. 5,696,444, dated Dec. 9, 1997, the entire disclosure of which is incorporated herein by reference. Such detector is used in combination with the back-up bearing 40 to sense a failure of the main support bearing 15 by sensing relative shaft displacement at the bearing wear detector location and permit the pump 1 to be safely shut down before any other damage can occur as described hereafter.

By way of example, the radial clearance 46 between the main support bushing 17 and shaft sleeve 16, or if the shaft sleeve 16 is omitted, between the main support bushing 17 and radial mating surface on the motor shaft 7 is approximately 0.002 inch, whereas the radial clearance 45 between the thrust ring retainer 26 and back-up bearing 42 is approximately 0.010 inch. The normal total indicated runout (TIR) of the motor shaft 7 supported by the main support bearing 15 is about twice the radial clearance 46 of the main support bearing 15 or approximately 0.004 inch. In this example, during normal operation, an average radial clearance of approximately 0.008 inch exists between the motor shaft 7 and back-up bearing 40 (e.g., the difference between the back-up bearing clearance of 0.010 inch and the main support bearing clearance of 0.002 inch). Also, the radial clearance 47 between the rotor element 12 of the bearing wear detector 14 which is mounted on the motor shaft 7, and the surrounding stationary stator liner element 13 of the detector may, for example, be approximately 0.020 inch.

Under normal operating conditions, very little wear of the main support bearing 15 is expected, whereby the bearing wear detector 14 should be set to indicate zero output when the rotor 12 is operating within the normal TIR for the motor shaft 7. As long as a primary failure of one or both of the main shaft support bearings 16, 17 does not occur, the back-up bearing 40 will remain out of contact with the thrust ring retainer 26 and thus won't provide support for the main shaft 7. However, if a failure of one or both bearings 16, 17 should occur, the main shaft 7 will be supported by the back-up bearing 40 (through the thrust ring retainer 26). In that event, the TIR will increase dramatically from approximately 0.004 inch (e.g., twice the radial clearance 46 of the main support bearing) to approximately 0.020 inch (e.g., twice the radial clearance 45 of the back-up bearing). Nevertheless, the average radial clearance between the rotor 12 and stator 13 will still be about 0.010 inch (e.g., the difference between the radial clearance 47 of 0.020 inch between the rotor and stator elements 12, 13 and radial clearance 45 of 0.010 inch of the back-up bearing 40).

The bearing wear detector 14 may be pre-programmed to determine radial movement, for example, of 0.013 inch as 100% allowable bearing wear. By setting alarm limits, for example, at 50% (e.g., 0.0065 inch) and 75% (e.g., 0.010 inch) of 100% allowable bearing wear, the value of 0.008 inch radial displacement that occurs upon failure of the main support bearing 15 will be between 50% and 75% of allowable bearing wear.

Figure 3:
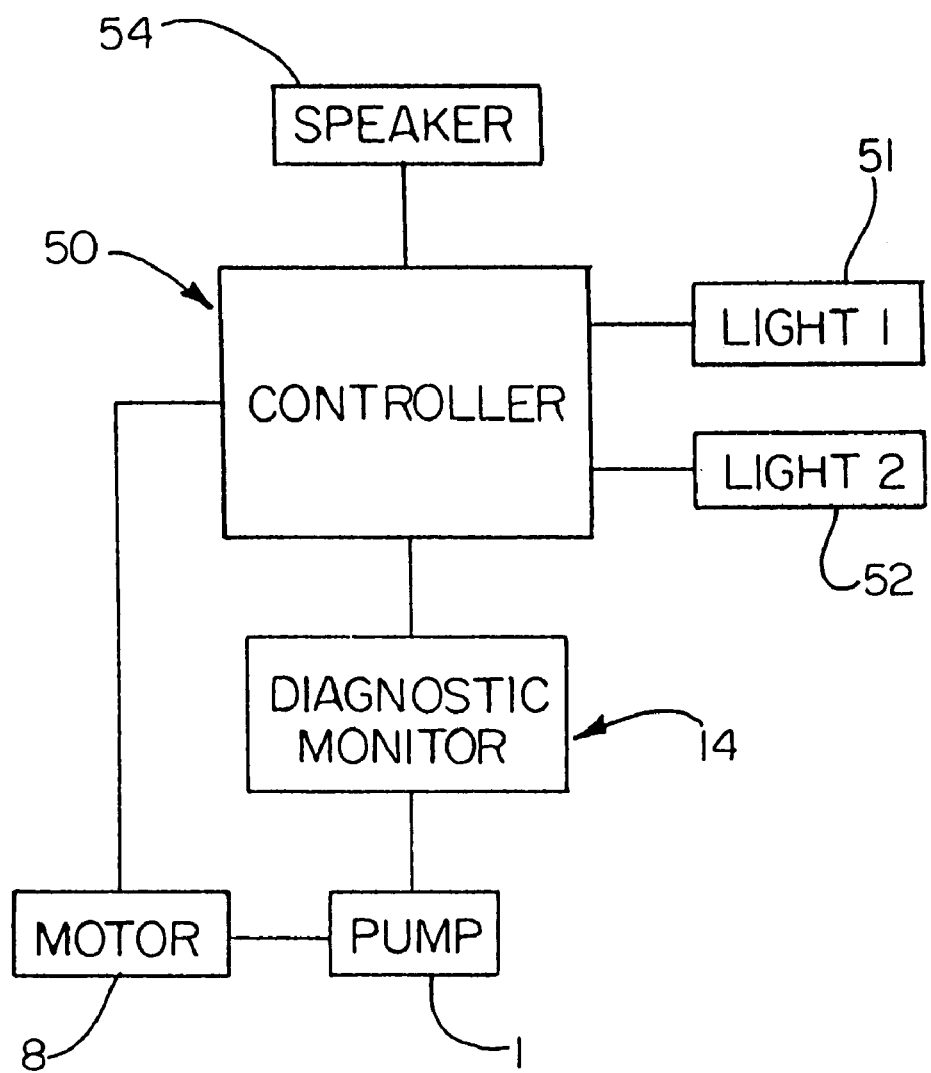
FIG. 3 is a schematic diagram showing how the bearing wear detector monitors bearing wear and provides a signal when the bearing wear exceeds a predetermined amount to permit an orderly shut-down of the pump so that the bearings can be replaced before other damage to the pump can occur.

As schematically shown in FIG. 3, the bearing wear detector (diagnostic monitor) 14 may be coupled through a controller 50 to one or more alarm outputs such as light outputs 51, 52 to provide a display indicating realtime percentage of radial movement of the motor shaft. If desired, one or more alarms/indicators such as light outputs may also be provided for showing realtime percentage of axial movement of the motor shaft.

Under normal operating conditions, when the rotor element 12 of the bearing wear indicator 14 is operating within the normal TIR for the motor shaft, the bearing wear indicator will, for example, indicate zero output. This can be visually displayed, for example, by causing one of the alarms such as light outputs 51, 52 representative of radial status to emit a signal such as a steady green light. Should the main support bearing 15 fail, the increased radial displacement of the rotor element 12 of 0.008 inch will cause the 50% setting of allowable bearing wear to indicate alarm status by extinguishing the signal (e.g., steady green light) and activating an alarm (e.g., a steady red light) from one of the alarm outputs 51, 52. If bearing wear should continue to the point where 75% or greater bearing wear is reached, the 75% setting may, for example, cause the steady alarm output (e.g., red light) to begin signalling (e.g., flashing), indicating that it is time to replace the bearings. Under most conditions, this will provide sufficient time to permit an orderly shut-down of the pump 1 before the rotor portion 11 of the motor 8 comes into contact with the stator liner 53 and causes additional damage to the rotating parts. Also, if desired, the controller 50 may cause both an audible alarm to be sounded through a speaker 54 and an automatic shut-down of the pump motor 8 as schematically illustrated in FIG. 3 when the 75% setting of allowable bearing wear is reached.

Although the noted values given in the above example are representative, it should be understood that other clearances and alarm set points may be used in different applications as desired.

From the foregoing, it will be apparent that by incorporating a back-up bearing in a rotary fluid pump in accordance with the present invention, all of the advantages of using hard bearing materials for the main support bearing including the bushing, shaft sleeve, and thrust ring such as improved load capacity, reduced wear rates, temperature capability and insensitivity to particulates can be obtained without the dangers of catastrophic bearing failures.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A fluid pump comprising a pump housing containing a pump impeller driven by a rotatable shaft, a driver for rotating said shaft, main support bearings for said shaft, back-up bearings for supporting said shaft upon failure of any components of said main support bearings, a diagnostic monitor for detecting a failure of any said components of said main support bearings by sensing relative shaft displacement and providing for a controlled shut down of said pump while said shaft is supported by said back-up bearings, and a controller responsive to said diagnostic monitor for indicating radial displacement of said shaft as a percentage of allowable wear of said main support bearings.

2. The pump of claim 1 further comprising means for signalling different levels of wear of said main support bearings as a percentage of allowable wear.

3. The pump of claim 1 further comprising a visual display for indicating different levels of wear of said main support bearings as a percentage of allowable wear.

4. The pump of claim 1 further comprising means for providing an audible signal when a predetermined level of wear of said main support bearings as a percentage of allowable wear is reached.

5. The pump of claim 1 wherein said controller causes said driver to shut down when a predetermined amount of allowable wear of said main support bearings is reached.

6. The pump of claim 5 wherein said controller causes said driver to shut down when approximately 75% of allowable wear of said main support bearings is reached.

7. The pump of claim 1 wherein said diagnostic monitor detects the average radial clearance between a rotor element on said shaft and a surrounding stationary stator liner element.

8. A fluid pump comprising a pump housing containing a pump impeller supported by a rotatable shaft, a driver for rotating said shaft, main support bearings for supporting said shaft, and back-up bearings for supporting said shaft upon failure of said main support bearings, said main support bearings comprising a bushing and thrust ring, said bushing being supported by a bushing retainer secured to said pump housing, and said thrust ring being supported adjacent said bushing by a thrust ring retainer fixed to said shaft for rotation therewith, said bushing retainer extending around said thrust ring retainer, said bushing retainer containing a counterbore for said back-up bearings, said back-up bearings having a radial clearance space with said thrust ring retainer which is greater than the radial clearance space between said main support bearings and said shaft.

9. The pump of claim 8 wherein said back-up bearings are positioned between said main support bearings and said driver, the radial clearance space between said back-up bearings and said thrust ring retainer being small enough to prevent shards that may result from failure of any components of said support bearings from passing through said radial clearance space and causing damage to other rotating parts of said pump.

10. The pump of claim 8 wherein said bushing surrounds a sleeve on said shaft.

11. The pump of claim 8 wherein said bushing surrounds a hard mating surface on said shaft.

12. A fluid pump comprising a pump housing containing a pump impeller supported by a rotatable shaft, a driver for rotating said shaft, hard main support bearing bushings for said shaft which are lubricated by the fluid being pumped, and back-up bearing bushings for supporting said shaft upon failure of said main support bearing bushings, said back-up bearing bushings being positioned between said main support bearing bushings and said driver, said back-up bearing bushings having a radial clearance space with first journal surfaces on said shaft that is greater than a radial clearance space between said main support bearing bushings and second journal surfaces on said shaft and yet small enough to prevent any shards that may result from failure of said main support bearing bushings from passing through the radial clearance space between said back-up bearing bushings and said first journal surfaces and damaging said driver.

13. The pump of claim 12 wherein said driver is contained in a motor cavity in communication with the fluid being pumped through the radial clearance space between said back-up bearing bushings and said first journal surfaces.

14. The pump of claim 12 wherein the radial clearance space between said back-up bearing bushings and said first journal surfaces is several times greater than the radial clearance space between said main support bearing bushings and said second journal surfaces.

15. The pump of claim 14 wherein the radial clearance space between said back-up bearing bushings and said first journal surfaces is approximately 0.010 inch and the radial clearance space between said main support bearing bushings and said second journal surfaces is approximately 0.002 inch.

16. The pump of claim 12 wherein said back-up bearing bushings are located in close proximity to said main support bearing bushings and provide sufficient support for said rotor shaft upon failure of said main support bearing bushings to permit a controlled shut down of said pump.

17. The pump of claim 12 further comprising a diagnostic monitor for detecting a failure of said main support bearing bushings.

18. The pump of claim 17 wherein said diagnostic monitor also provides for controlled shut down of said pump upon detection of any such failure.

19. The pump of claim 12 further comprising a diagnostic monitor for detecting wear of said main support bearing bushings by sensing relative shaft displacement.

20. The pump of claim 19 further comprising a controller responsive to said diagnostic monitor for indicating radial displacement of said shaft as a percentage of allowable wear of said main support bearing bushings.

21. The pump of claim 20 further comprising means for signalling different levels of wear of said main support bearing bushings as a percentage of allowable wear.

22. The pump of claim 20 further comprising a visual display for indicating different levels of wear of said main support bearing bushings as a percentage of allowable wear.

23. The pump of claim 20 further comprising means for producing an audible signal when a predetermined level of wear of said main support bearing bushings as a percentage of allowable wear is reached.

24. The pump of claim 12 wherein said main support bearing bushings are supported by bushing retainers secured to said pump housing, and thrust rings are supported adjacent said main support bearing bushings by thrust ring retainers fixed to said shaft for rotation with said shaft.

25. The pump of claim 24 further comprising radial grooves in said thrust rings for promoting fluid flow through said main support bearing bushings.

26. The pump of claim 24 wherein said bushing retainers extend around said thrust ring retainers and contain counterbores in which said back-up bearing bushings are received, said radial clearance space between said back-up bearing bushings and said first journal surfaces being located between said back-up bearing bushings and said thrust ring retainers.

* * * * *